United States Patent [19]

Citterio

[11] Patent Number: 5,622,275

[45] Date of Patent: Apr. 22, 1997

[54] SECTIONAL MODULAR VIDEO-INTERCOM CONTROL PANEL FOR SIMPLIFIED WIRING

[75] Inventor: Antonio Citterio, Carate Brianza, Italy

[73] Assignee: LT Terraneo S.p.A., Erba, Italy

[21] Appl. No.: 243,825

[22] Filed: May 17, 1994

[30] Foreign Application Priority Data

May 19, 1993 [IT] Italy ................................ MI930415 U

[51] Int. Cl.[6] .................................................. B65D 73/02
[52] U.S. Cl. ........................ 220/4.02; 206/724; 206/725
[58] Field of Search ................................. 220/4.02, 3.92; 206/724, 723, 722, 725

[56] References Cited

U.S. PATENT DOCUMENTS

| | | | |
|---|---|---|---|
| 4,564,880 | 1/1986 | Christ et al. ............................ | 206/724 |
| 4,706,161 | 11/1987 | Buckingham ........................... | 206/724 |
| 4,725,922 | 2/1988 | Matsuoka ............................... | 206/724 |
| 5,080,228 | 1/1992 | Maston, III et al. .................... | 206/724 |
| 5,109,980 | 5/1992 | Matsuoka et al. ...................... | 206/724 |

*Primary Examiner*—Joseph M. Moy
*Attorney, Agent, or Firm*—Cushman Darby & Cushman IP Group of Pillsbury Madison & Sutro LLP

[57] ABSTRACT

A sectional modular video-intercom control panel for simplified wiring including a frame for housing modules, the frame having at least one seat (i.e., bay) for at least one respective module, a cover element such as a one-piece bezel or a plurality of bezel pieces connectable together being applied to the edges of the frame. In the control panel, the module seat or seats can be divided in half by an insertable crosspiece located in recesses provided in the frame, the module seats being separated by fixed crosspieces which are connected to the inner edges of the frame by preferential fracture lines.

12 Claims, 4 Drawing Sheets

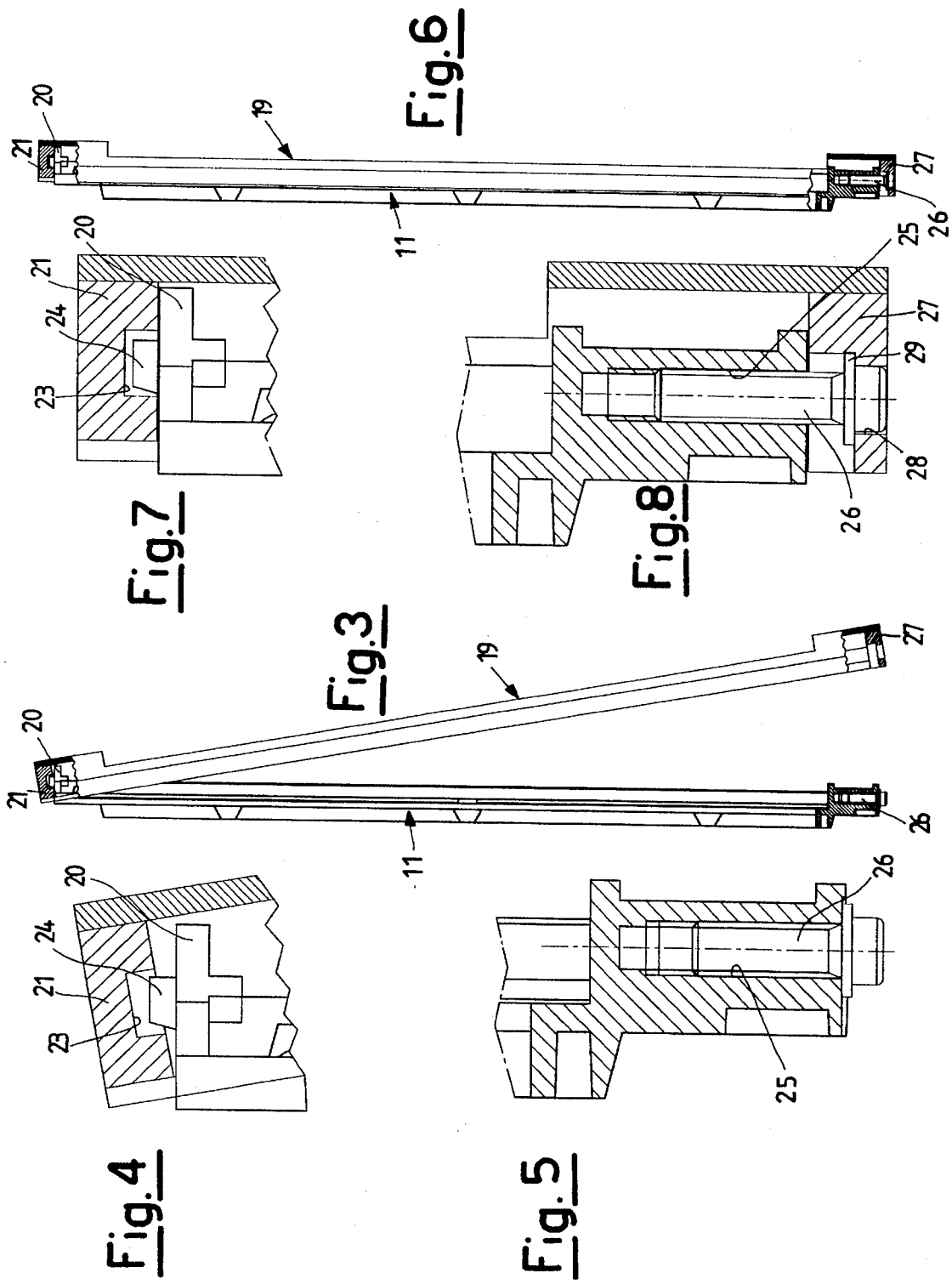

5,622,275

SECTIONAL MODULAR VIDEO-INTERCOM CONTROL PANEL FOR SIMPLIFIED WIRING

BACKGROUND OF THE INVENTION

This invention relates to a sectional modular video-intercom control panel for simplified wiring.

Known intercom or video-intercom control panels comprise metal and plastics surfaces carrying the remote-station call pushbuttons, either individual or grouped into modules. The control panels also carry the sound circuit components and, in the case of a video-intercom, the telecamera with its background lighting window.

The enormous variety of shapes, number of buttons, arrangement, types and colours results in a very large range of pieces to be installed, with serious interchangeability and stocking problems. These drawbacks are overcome by the control panel of the present invention.

SUMMARY OF THE INVENTION

A sectional modular video-intercom control panel for simplified wiring comprising a frame for housing modules, the frame having at least one seat for at least one respective module, a cover element such as a one-piece bezel or a plurality of bezel pieces connectable together being applied to the edges of the frame. In the control panel, the module seat or seats can be divided in half by an insertable crosspiece located in recesses provided in the frame, the module seats being separated by fixed crosspieces which are connected to the inner edges of the frame by preferential fracture lines.

The characteristics and advantages of the present invention will be more apparent from the description given hereinafter with reference to the accompanying drawings, in which:

FIG. 3 is a side view of FIG. 2 before the bezel has been completely mounted;

FIGS. 4 and 5 show enlarged details of FIG. 3;

FIG. 6 is a side view similar to that of FIG. 3 with the bezel completely mounted;

FIGS. 7 and 8 show the enlarged details of FIGS. 4 and 5 with the bezel completely mounted;

DETAILED DESCRIPTION

The drawings represent preferred embodiments of a sectional modular video-intercom control panel for simplified wiring according to the present invention. However a much greater number of combinations are possible, including the use of different proportions for the various parts.

FIGS. 1 to 10 show a control panel of the invention consisting of three modules, but which could be provided in any number. The control panel, indicated overall by 10, comprises a support element or frame 11 in which seats or housings (i.e., bays) 12, 12', 12" etc. are provided for receiving a plurality of modules, not shown, and on which edge cover elements can be positioned. In the example the frame is provided for three modules, but could equivalently be provided for one, two, etc.

Figure 2:
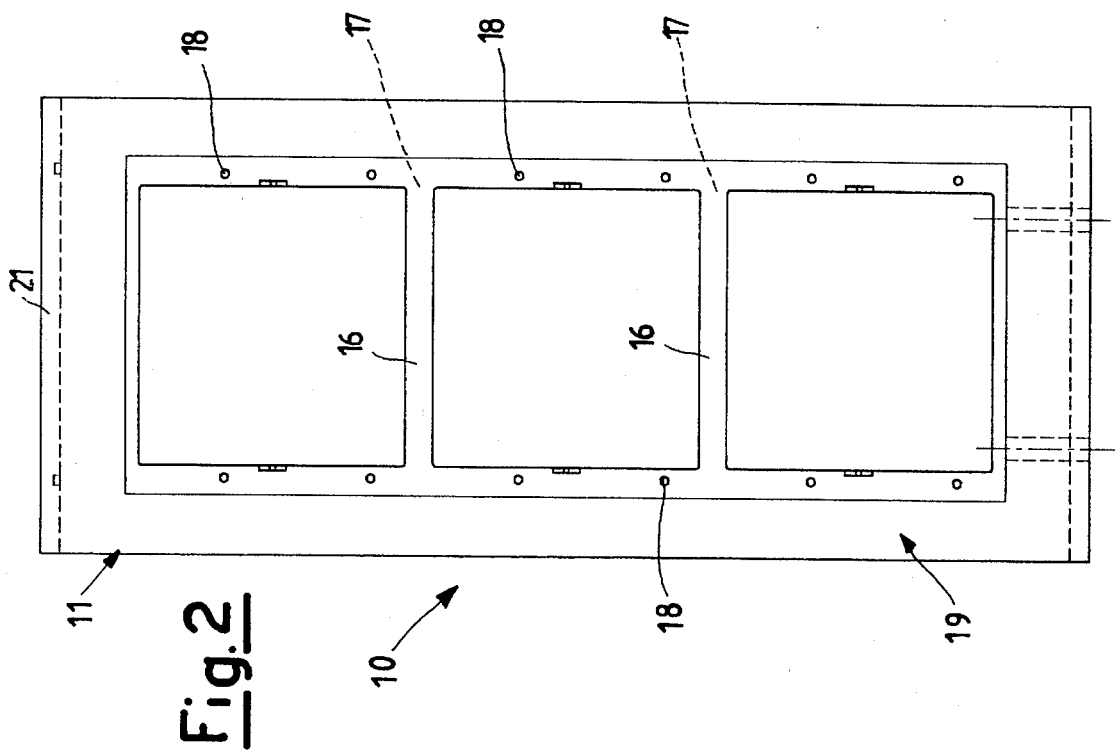
FIG. 2 is a view of the support of FIG. 1 covered by a bezel formed from a profiled element.
Figure 1:
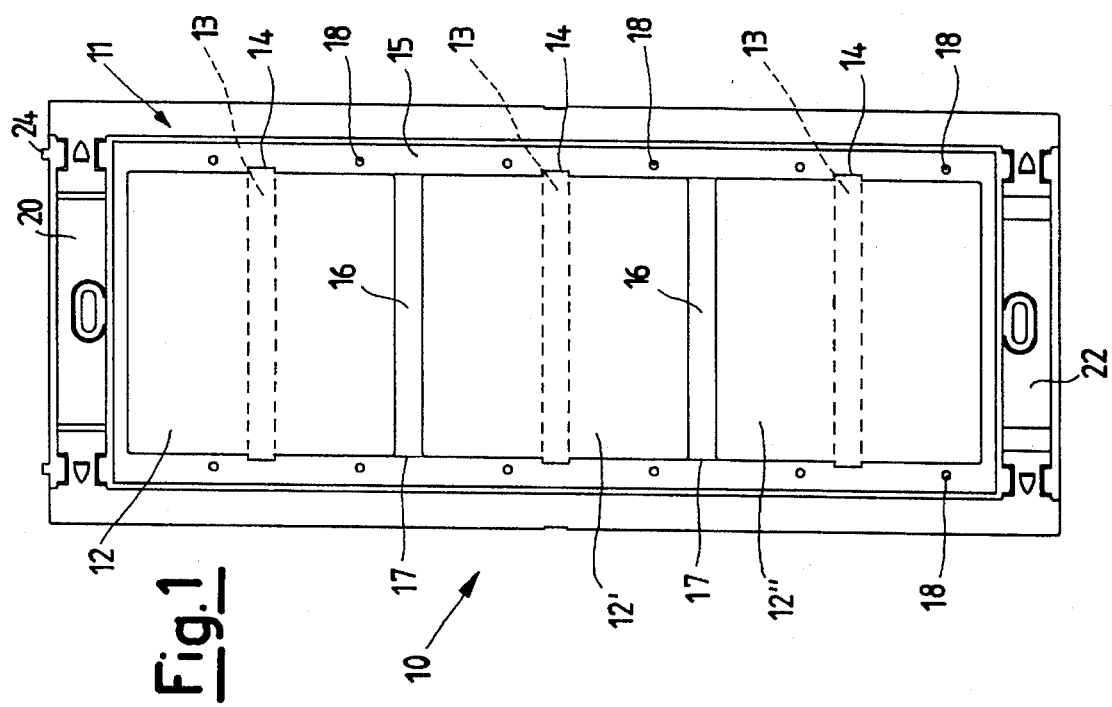
FIG. 1 is a view representing a diecast support for three modules for a control panel according to the present invention.

According to the present invention each module seat or housing 12', 12" etc. can be divided in half to form two separate seats by positioning an insertable crosspiece 13, shown by dashed lines in FIG. 1. This crosspiece can be inserted into location recesses or notches 14 provided in the inner edges 15 of each seat 12, 12', 12" etc.

In this manner the number of half-surface modules can be increased, and in addition the already existing fixed crosspieces 16 rigid with the frame 11 can be mechanically removed by virtue of the presence of preferential fracture lines 17. This is done by breaking them off at the predetermined points 17 to hence provide seats for multiple-surface modules. With this different-order method the module combination sizes can be submultiples or multiples of one module, without any dimensional limitation.

To prevent mistakes in the mounting of the modules on the frame, each seat 12, 12', 12" etc. comprises a series of holes, four holes 18 being shown in the example, which are positioned asymmetrically about the seat and in which the corresponding projections on the modules are engaged in accordance with a fixed arrangement.

FIGS. 2–8 show a three-module frame 11, to which there is applied a flat bezel 19 forming a first cover element, which perfectly mates with and completely occupies an outwardly projecting edge of the frame 11 the upper and lower horizontal portions of which are indicated by 20 and 22.

FIGS. 3–8 show the system for mounting and fixing the bezel 19 onto the frame 11. Firstly the upper edge 21 of the bezel 19 is fitted onto the upper edge 20 of the frame such that the two notches 23 provided in the upper end of the bezel 19 fit onto corresponding teeth 24 on the upper edge 20 of the frame 11.

Having effected this engagement, the bezel 19 is rotated about its upper edge 21 and pushed against the frame 11. Two fixing screws 26 for the bezel 19 are screwed into relative seats 25 in the lower edge 22 of the frame 11, the bezel lower edge 27 comprising through holes 28.

FIGS. 6–8 show the position of the bezel 19 when locked to the frame 11, this being achieved by totally slackening the screws 26, which at the end of their travel engage in the holes 28 present in the lower end edge 27 of the bezel 19. The special-type screws comprise an underhead enlargement indicated by 29 which abuts against the inner part of the lower end 27. The invention also ensures that the screws cannot be lost, and provides reliable and invisible fixing of the bezel.

FIGS. 9–13 show the same frame 11, but used in a different arrangement from that shown in FIGS. 2–8. In this respect, the bezel 19 is replaced by a plurality of pieces including two strips 30 and 31 applicable rigidly to the two sides of the frame by elastic engagement.

The left hand strip 30 is shown already inserted whereas the right hand strip 31 is undergoing insertion. The strips comprise two projecting elements 32 acting as locators and engagement elements, and which are positioned and engage in respective seats 33 which also act as guides. In the seats 33 there are provided projection elements 34 which engage in recesses 35 provided below the projecting elements 32 to achieve stable and definitive snap-positioning.

Figure 10:
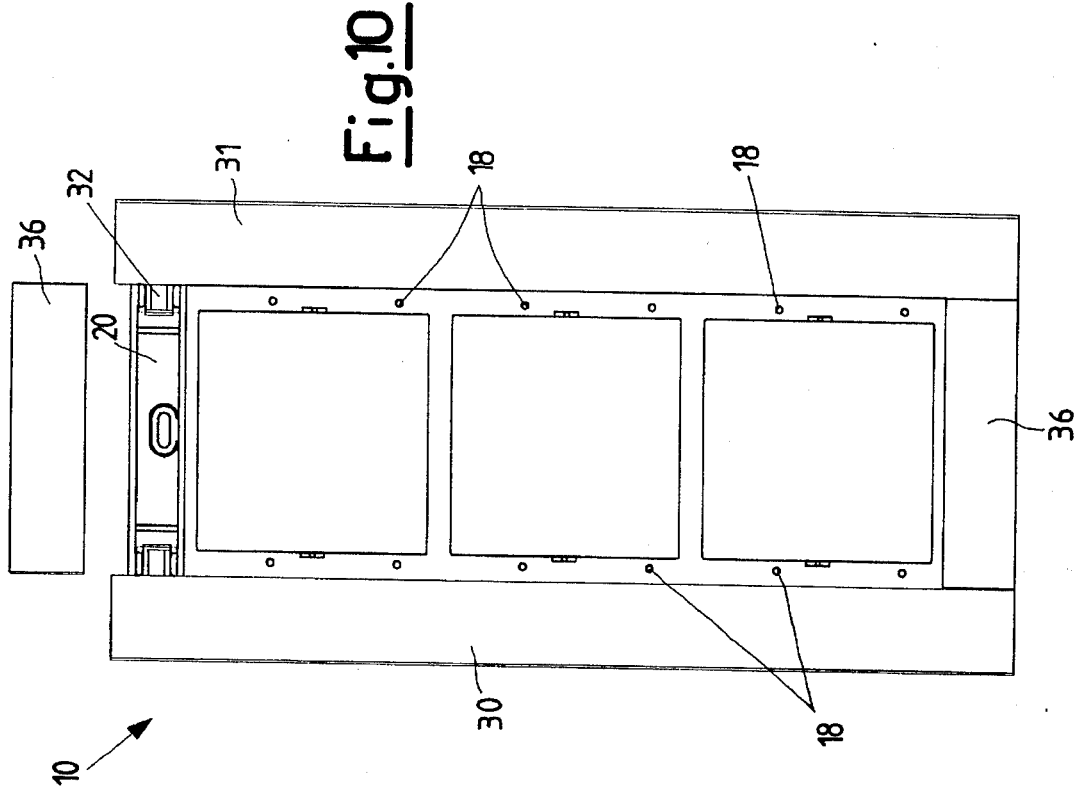
FIG. 10 shows the support of FIG. 9 with both vertical strips and one horizontal strip in position, the remaining horizontal strip being shown separate.
Figure 9:
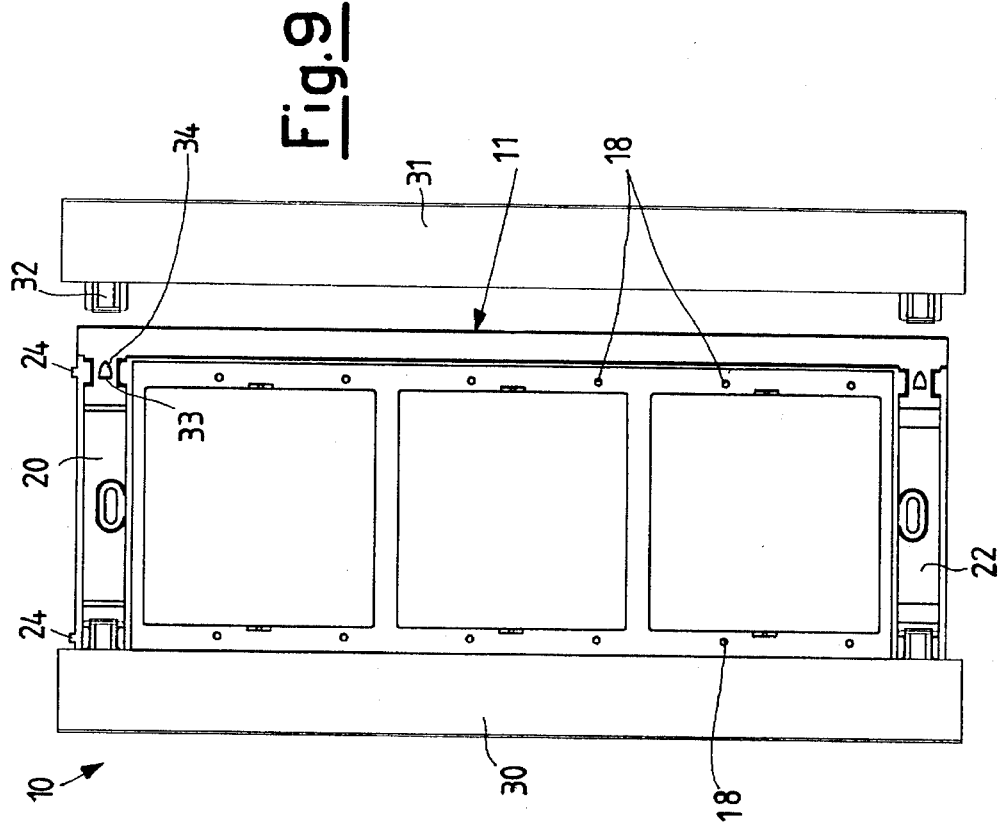
FIG. 9 shows a support such as that of FIG. 1 but using a different cover element of strip type, of which one vertical strip is shown in position while the other is shown separate awaiting positioning.

FIG. 10 shows the frame 11 with the two vertical strips 30 and 31 already inserted, two end cross-strips 36 representing further pieces of the cover element also being provided, of which the lower one is already in position and the upper one is still to be positioned.

When the two end cross-strips have been positioned they complete the bezel line to hide the coupling elements 32, 33, 34 and 35 and the control panel fixing screws, not shown.

Figure 11:
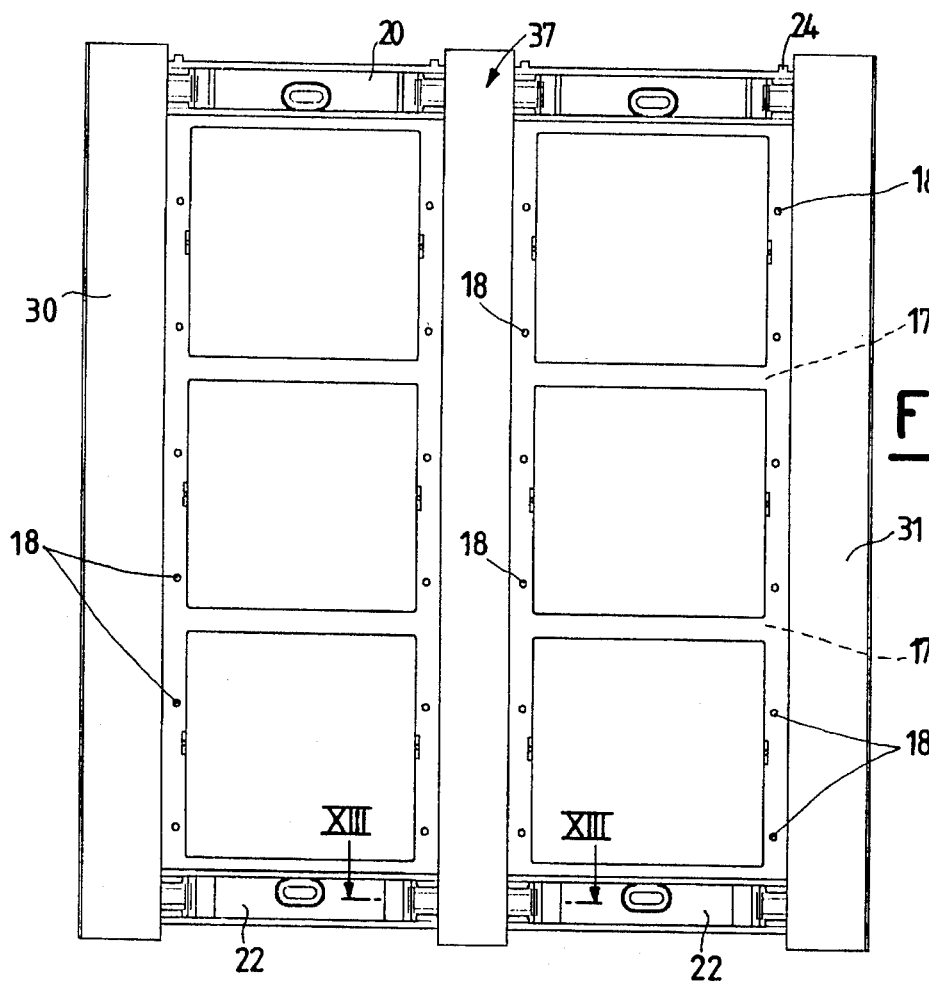
FIG. 11 shows two support elements connected together by a vertical connection strip.
Figure 12:
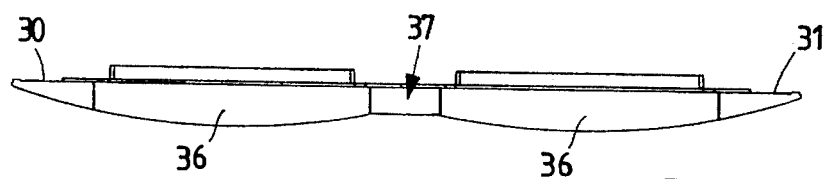
FIG. 12 is a top view of the support elements of FIG. 11 with both the vertical and horizontal strips in position.
Figure 13:
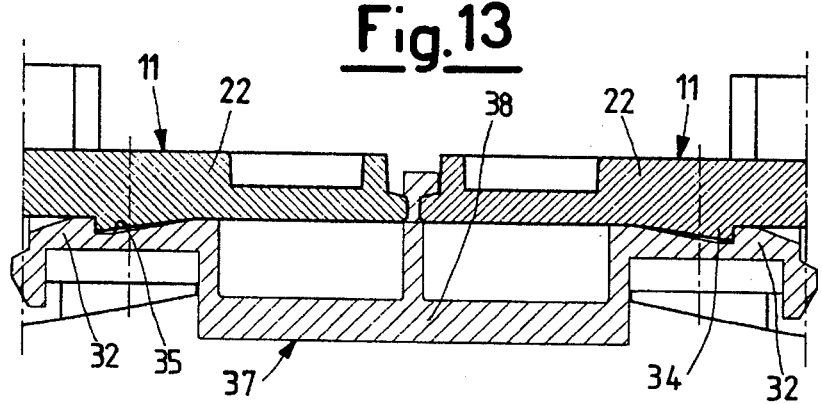
FIG. 13 is a section through a detail on the line XIII—XIII of FIG. 11.

FIGS. 11–13 show the facility for combining control panels of the invention using a central connection strip 37 interposed between two or more frames 11, to achieve a horizontal extension of the desired form.

As shown in FIG. 13, the central strip 37 comprises a central upright 38 superimposed on the vertical edges of the frame 11, and at least two pairs of projecting elements 32 extending from opposite sides of the central upright 38 for insertion into the seats 33 provided in the horizontal edges 20 and 22 of the adjacent frames.

This system provides alignment of the control panel components and also maintains the distance between fixing axes for the respective modules and respective housing boxes.

The vertical edges of the control panel are covered by the already described strips 30 and 31, whereas the upper and lower edges 20 and 22 of the frame 11 are covered by end cross-strips 36.

FIG. 12 shows the combination of two adjacent frames in profile. For example, according to the present invention the control panel consists of a diecast support, which can receive half modules, whole modules or multiple modules by applying an insertable crosspiece or removing a fixed crosspiece forming part of the support or frame.

Advantageously, as seen, the support frame is covered by an aluminium profiled element with non-exposed ends and with unlosable screws.

Instead of the aluminium profiled cover the frame can receive four plastics segments or strips and cross-strips which remain engaged, the two lateral strips being mounted first in a permanent manner, followed by two horizontal strips, one upper and one lower, which also cover the screws fixing the frame to its housing box. The reason for this support versatility is determined by the various combinations assumed by the modules to arrive at the number required for calling the remote stations.

I claim:

1. A video-intercom control panel for simplified wiring, comprising:

a frame for housing video-intercom modules, said frame including at least two frontally opening bays for receiving and seating video-intercom modules having a given facial height and width;

at least two of said bays adjoining one another height-wise or width-wise of the frame and being facially separated by at least one respective integrally fixed crosspiece which is arranged to be broken away from the frame along provided preferential fracture lines, for thereby converting said at least two adjoining bays into a smaller number of at least one larger bay, each for receiving and seating a video-intercom module having at least one of a facial height and a facial width which is correspondingly larger than said given facial height and width;

said frame, coinciding with an intermediate location of at least one of said bays being provided with at least one pair of two perimetrically opposed mounting sites for a respective separate crosspiece, for dividing the respective bay into a plurality of smaller bays, each for receiving and securing a respective video-intercom module having at least one of a facial height and a facial width which is correspondingly smaller than said given height and width;

at least one cover element arranged for facially covering a corresponding portion of a front side of said frame around said bays; and interfitting features on said front side of said frame and on each said cover element, for mounting each said cover element to said frame facially covering a corresponding portion of said front side of said frame.

2. The video-intercom control panel of claim 1, wherein:

said at least one cover element is constituted by a one-piece bezel, and said portion includes all of said front side of said frame.

3. The video-intercom control panel of claim 1, wherein:

said at least one cover element is constituted by a plurality of interconnected cover elements.

4. The video-intercom control panel of claim 1, further comprising:

said frame, coincident with each said bay, being provided with a plurality of asymmetrically located features arranged for interfitting with modules only when the modules are positioned in a predetermined location respective of said bays.

5. The video-intercom control panel of claim 2, wherein:

said interfitting features include hooks engaged along one edge of said bezel and screw fasteners engaged along an opposite edge of said bezel.

6. The video-intercom control panel of claim 4, wherein:

said screw fasteners include features locking said screws in one of said bezel and frame for imparting unlosability to said screw fasteners.

7. The video-intercom control panel of claim 3, wherein:

said cover elements include two vertical side strips, and two horizontal end cross-strips.

8. The video-intercom control panel of claim 7, comprising:

complementary engagement members positioning said cover elements on said frame.

9. The video-intercom control panel of claim 8, wherein:

said complementary engagement members are constituted by projecting locator elements and seats, into which said projecting locator elements are insertable.

10. The video-intercom control panel of claim 9, wherein:

said projecting locator elements are snappable into said seats for achieving snap-positioning of said cover elements on said frame.

11. The video-intercom control panel of claim 8, wherein:

one of said cover elements is constituted by a vertical side strip provided with members of two sets of said complementary engagement elements, one for engagement with said frame, and another for engagement with a like frame.

12. The video-intercom control panel of claim 1, having at least one said bay receiving a respective video-intercom module, at least one said larger bay receiving a respective larger video-intercom module, and at least one said smaller bay receiving a respective smaller video-intercom module.

* * * * *